M. F. SULLIVAN.
STEREOSCOPIC PROJECTION APPARATUS.
APPLICATION FILED AUG. 24, 1914.
1,189,308. Patented July 4, 1916.
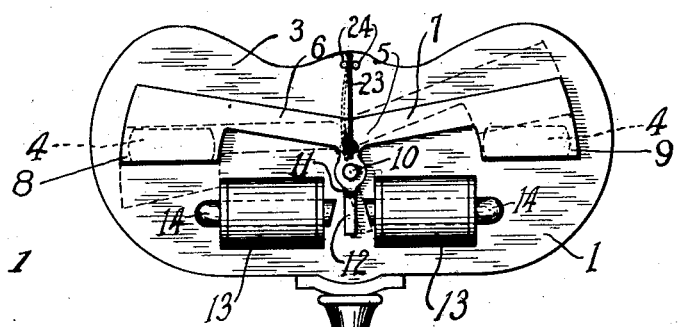
Fig. 1
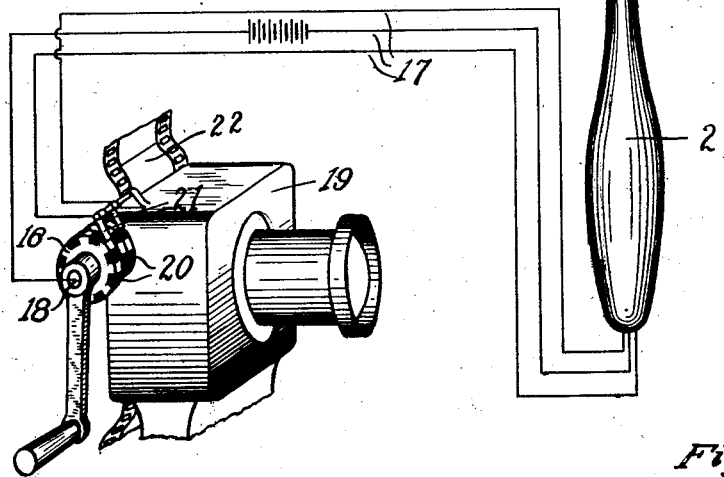
Fig. 2
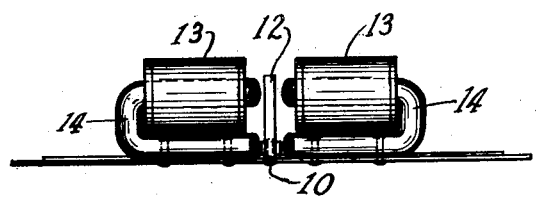
Witnesses: Inventor:
Walter F. Stone Michael Francis Sullivan
William E. Hann. By Rummler & Rummler,
Attys.

UNITED STATES PATENT OFFICE.

MICHAEL FRANCIS SULLIVAN, OF CHICAGO, ILLINOIS.

STEREOSCOPIC PROJECTION APPARATUS.

1,189,308.  Specification of Letters Patent.  Patented July 4, 1916.

Application filed August 24, 1914. Serial No. 858,224.

*To all whom it may concern:*

Be it known that I, MICHAEL FRANCIS SULLIVAN, a citizen of the United States of America, and a resident of Chicago, county of Cook, and State of Illinois, have invented certain new and useful Improvements in Stereoscopic Projection Apparatus, of which the following is a specification.

The main objects of this invention are to provide an improved apparatus for alternately cutting off the vision from the right and left eyes of an observer so that suitably projected motion pictures, or two stationary stereoscopic views projected alternately, will be seen in stereoscopic projection by the observer; to provide in such apparatus an improved form of shutter whereby each of the observer's eyes will be completely screened before the other eye receives light from the picture; to provide improved means for operating the shutter whereby it is moved quickly and in exact synchronism with the shutter of the picture projecting machine; and to provide improved means for controlling the operating mechanism of the shutter.

An illustrative embodiment of this invention is shown in the accompanying drawings, in which:

Figure 1 is a view showing in elevation, the observer's apparatus; in diagram, the electric circuits for operating the same; and in perspective, the controlling means for the electric circuit. Fig. 2 is a bottom plan of the observing device with the handle removed.

Heretofore in devices of this class the shutters used to open and close the apertures in the screen of the observing devices were of a design whereby one of the apertures was being opened as the other was being closed, and when the shutter was in a central or neutral position both apertures would be partly open. With such an arrangement each of the eyes of the observer would see part of the picture intended only for the other eye, thereby destroying a part of the stereoscopic effect, and also producing a fluttering or blurring of the picture.

In the construction shown in the drawings, the observing device 1 is provided with a suitable handle 2 and a body shown in the form of a screen 3 having apertures 4 therein serving as sight openings, and spaced apart to register with the eyes of the user. A shutter 5 having arms 6 and 7 with depending ends 8 and 9 respectively is mounted on the screen 3 by a suitable pivotal connection 10. The shutter 5 is further provided with a depending arm 11 with an armature 12 at its end.

Operating mechanism for the shutter is provided in the form of a pair of electro-magnets 13 having U-shaped cores 14. Means for holding the shutter in a central or neutral position when not in operation, and to quickly restore it to this position after being displaced toward either side, are provided and comprise a spring arm 23 rigidly mounted on the shutter 5 and having sliding engagement between pins 24 on the screen 3. The controlling means for operating the shutter 5 in synchrony with the pictures, as they are moved into position to be projected, comprise a controller 16 for alternately opening and closing the electric circuits of conductors 17 which are connected to the electro-magnets 13, thereby operating the shutter 5 by attracting the armature 12. The circuit controller 16 is arranged to be attached to the shaft 18 of the operating handle of the projector 19, and comprises two annular rows of contact segments electrically connected but provided with insulated portions 20 on their peripheries, these portions being so arranged that when one of the brushes 21 is in a closed circuit the other is riding on an insulated portion and its circuit is open, but the contact segments in each row are of a slightly greater peripheral length than the insulated portions, thus insuring that each circuit will be closed slightly in advance of the opening of the other.

In the operation of the device, a cinematograph film 22 may be used whereon the successive pictures have been taken from alternately two different points of view, preferably points spaced about the pupilary distance or more apart; and the shutter (not shown) of the projecting machine causes the pictures from the right-hand point of view to be displayed alternately with those taken from the left-hand point of view. Two stereoscopic stationary views may be also used by employing a projecting machine which displays the views alternately upon the screen at suitable intervals. The controller 16, being directly connected with the operating handle of the projecting machine, causes the shutter of the observer's apparatus to operate so that the opening for the right eye will be uncovered when pictures from the right-hand point of view are displayed and vice versa. The observing device 1 is held before the eyes of the observer in the same manner as an opera glass or lorgnette would be held. As will be seen, the depending ends 8 and 9 of the shutter are so arranged that one of the apertures is entirely closed before the other aperture is opened, thereby preventing any possibility of one of the eyes of the observer seeing a portion of the picture intended for the other eye.

I claim:—

1. A device of the class described, comprising a body having a pair of sight openings spaced apart to register with the eyes of the user, a shutter adapted to control said sight openings comprising a pivoted member having parts located to alternately close said openings through the pivotal movement of said member, said parts being shaped and arranged to fully close one of said sight passages before the other is opened, an armature carried by said member, a pair of electro-magnets coöperating with said armature to oscillate said shutter, and yielding means normally holding said parts in position to close said openings.

2. A device of the class described, comprising a body having a pair of sight openings therein and spaced apart to register with the eyes of the user, a shutter pivotally mounted on said body and adapted to alternately close said openings through pivotal movement thereof, an armature carried by said shutter, a pair of electro-magnets disposed on opposite sides of said armature for oscillating said shutter, a leaf spring having one end attached to said shutter, and a pair of pins on said body for embracing the other end of said spring, said spring being arranged to normally hold said shutter in position to close both said openings.

Signed at Chicago this 20th day of August 1914.

M. FRANCIS SULLIVAN.

Witnesses:
 EUGENE A. RUMMLER,
 M. IRENE HUTCHINGS.